US011308932B2

(12) United States Patent
Cai et al.

(10) Patent No.: US 11,308,932 B2
(45) Date of Patent: Apr. 19, 2022

(54) VIRTUAL TEST ENVIRONMENT FOR ACTIVE NOISE MANAGEMENT SYSTEMS

(71) Applicant: HARMAN INTERNATIONAL INDUSTRIES, INCORPORATED, Stamford, CT (US)

(72) Inventors: Tingli Cai, Stamford, CT (US); Divya Sishtla Venkata, Stamford, CT (US); David Trumpy, Stamford, CT (US); Aditya Kumar, Stamford, CT (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/955,827

(22) PCT Filed: Dec. 20, 2018

(86) PCT No.: PCT/IB2018/060391
§ 371 (c)(1),
(2) Date: Jun. 19, 2020

(87) PCT Pub. No.: WO2019/123345
PCT Pub. Date: Jun. 27, 2019

(65) Prior Publication Data
US 2020/0342846 A1    Oct. 29, 2020

Related U.S. Application Data

(60) Provisional application No. 62/608,275, filed on Dec. 20, 2017.

(51) Int. Cl.
*G10K 11/178* (2006.01)
*H04R 1/40* (2006.01)
(Continued)

(52) U.S. Cl.
CPC .. *G10K 11/17854* (2018.01); *G10K 11/17873* (2018.01); *H04R 1/406* (2013.01);
(Continued)

(58) Field of Classification Search
CPC ....... G10K 11/17854; G10K 11/17873; G10K 2210/1081; G10K 2210/1282;
(Continued)

(56) References Cited

U.S. PATENT DOCUMENTS

2004/0086131 A1    5/2004  Ringlstetter et al.
2013/0156213 A1*   6/2013  Pan ................. G10K 11/17857
                                                        381/71.4
(Continued)

FOREIGN PATENT DOCUMENTS

CN    103988525 A    8/2014
CN    105473988 A    4/2016
(Continued)

OTHER PUBLICATIONS

Barteld, 2016, Virtual Reality Performance Auralization in a Calibrated model of Notre-Dame Cathedral, p. 5.*
(Continued)

*Primary Examiner* — William A Jerez Lora
(74) *Attorney, Agent, or Firm* — Brooks Kushman P.C.

(57) ABSTRACT

A system for evaluating a noise management module of a vehicle includes a controller programmed to filter speaker signals from the noise management module using an auralization model to produce auralized sound signals that create a spatial effect to simulate sound in the vehicle at a predetermined position within the vehicle that is different than the positions corresponding to microphones used by the noise management module.

20 Claims, 4 Drawing Sheets

(51) Int. Cl.
    *H04R 3/00*          (2006.01)
    *H04S 7/00*          (2006.01)

(52) U.S. Cl.
    CPC ............. *H04R 3/005* (2013.01); *H04S 7/304* (2013.01); *G10K 2210/1081* (2013.01); *G10K 2210/1282* (2013.01); *G10K 2210/3028* (2013.01); *G10K 2210/3035* (2013.01); *G10K 2210/3052* (2013.01); *G10K 2210/504* (2013.01); *H04R 2499/13* (2013.01); *H04S 2400/11* (2013.01); *H04S 2400/15* (2013.01); *H04S 2420/01* (2013.01)

(58) Field of Classification Search
    CPC ... G10K 2210/3028; G10K 2210/3035; G10K 2210/3052; G10K 2210/504; H04R 1/406; H04R 3/005; H04R 2499/13; H04S 7/304; H04S 2400/11; H04S 2400/15; H04S 2420/01
    USPC ............... 381/71.1, 71.4, 86, 94.1, 124, 302
    See application file for complete search history.

(56) References Cited

U.S. PATENT DOCUMENTS

| | | | |
|---|---|---|---|
| 2014/0101351 A1* | 4/2014 | Hooper | G06F 13/364 710/110 |
| 2016/0098989 A1* | 4/2016 | Layton | G10L 21/0208 704/233 |

FOREIGN PATENT DOCUMENTS

| | | |
|---|---|---|
| CN | 107039029 A | 8/2017 |
| EP | 1344427 A1 | 9/2003 |
| EP | 1900252 B1 | 7/2013 |
| EP | 2792167 B1 | 3/2016 |
| JP | H0411291 A | 1/1992 |
| KR | 20080067578 A | 7/2008 |

OTHER PUBLICATIONS

International Search Report and Written Opinion for Application No. PCT/IB2018/060391 filed Dec. 20, 2018, dated May 10, 2019, 13 pages.
Janocha H. et al., "Simulation approach and causality evaluation for an active noise control system", IEE Proceedings D. Control Theory & Applications, Institution of Electrical Engineers, Jul. 28, 1998, pp. 423-426, vol. 145, No. 4.
Wikipedia, https://en.wikipedia.org/wiki/IEEE_802.11, "IEEE 802.11", Downloaded Feb. 16, 2021, 16 pages.
First Chinese Office Action for Chinese Application No. 201880080759.1, dated May 18, 2021, 13 pgs.
First European Office Action for European Application No. 18842659.7, dated Aug. 12, 2021, 8 pgs.
Second Chinese Office Action for Chinese Application No. 201880080759.1, dated Oct. 21, 2021, 22 pages.
Third Chinese Office Action for Chinese Application No. 201880080759.1, dated Mar. 1, 2022, 3 pages.

* cited by examiner

VIRTUAL TEST ENVIRONMENT FOR ACTIVE NOISE MANAGEMENT SYSTEMS

CROSS-REFERENCE TO RELATED APPLICATION

This application is the U.S. National Phase of PCT Appln. No. PCT/IB2018/060391, filed on Dec. 20, 2018, and entitled "VIRTUAL TEST ENVIRONMENT FOR ACTIVE NOISE MANAGEMENT SYSTEMS", which claims the benefit of U.S. Provisional Application Ser. No. 62/608,275, filed on Dec. 20, 2017, the entire disclosures of which are incorporated herein by reference the disclosure of which is incorporated in its entirety by reference herein.

TECHNICAL FIELD

This application generally relates to a hardware-in-the-loop (HIL) system for vehicle active noise management systems.

BACKGROUND

Much effort has been expended to create a quiet cabin environment in vehicles. A typical goal in vehicle design is to minimize audible noise in the cabin. Consumers desire to be isolated from road noise, powertrain noise, and other unwanted noise sources. Vehicles may include various insulating materials between the cabin and noise producing components. However, the insulating materials may be expensive and add weight to the vehicle. Some modern vehicles include an active noise management system to reduce the audible noise in a vehicle cabin.

An active noise management system may operate by using microphones and speakers to attempt to cancel out the unwanted noise. The active noise management system may detect noise signals via the microphones. The microphone signals may be processed and speaker output signals may be generated that cancel the noise. For example, a speaker may generate a cancelling signal at the microphone location that is 180 degrees out of phase compared to the unwanted noise signal. The effect is to create a canceling noise that eliminates the unwanted noise.

Development of active noise management systems requires extensive testing in the actual vehicle environment. Tuning and calibration requires repetitive trials and adjustments in order to arrive at an effective calibration set for the system. During vehicle development, vehicle time may be difficult to obtain as there are many systems under development that are competing for vehicle time. Once a vehicle is obtained, the vehicle and environmental conditions may impact the testing process. For example, wind, weather, air temperature, component temperatures, and road conditions may vary between tests. Replicating a test sufficiently may therefore require additional testing time and effort.

SUMMARY

A hardware-in-the-loop (HIL) system for interfacing with an active noise management system includes a controller configured to output microphone signals to an active noise management system. The controller is further configured to receive speaker signals from the active noise management system. The controller is further configured to process the speaker signals through a transfer function that models the response of the sound from the speakers to the microphones. The controller is configured to generate the microphone signals based on the speaker signals and a noise signal. The controller is further configured to render a spatial sound field using binaural information (e.g., add auralization effect). The HIL system may be configured to evaluate the sound field inside the cabin compartment using auralization.

A system for evaluating a noise management module of a vehicle, the system includes a controller programmed to receive speaker signals from and transfer microphone signals to the noise management module. The controller is further programmed to filter the speaker signals with a vehicle acoustic model to generate sound signals caused by the speaker signals at positions corresponding to locations of microphones in the vehicle that are associated with the noise management module. The controller is further programmed to combine a sound profile and the sound signals to generate the microphone signals. The controller is also programmed to filter the speaker signals with an auralization model to produce rendered sound signals that create a spatial listening effect to simulate sound caused by the speaker signals at a predetermined position within the vehicle that is different than the positions corresponding to the locations of the microphones.

The predetermined position may be associated with a seating position within the vehicle and an expected location of a head of a vehicle occupant seated at the seating position. The auralization model may be derived from actual speaker data from the vehicle and actual microphone data from evaluation microphones placed proximate the predetermined position in the vehicle. The controller may be further programmed to combine the rendered sound signals with the sound profile to generate an evaluation sound signal. The controller may be further programmed to output the evaluation sound signal to an audio output device. The auralization model may represent an acoustic environment of the vehicle and may define a transfer function between sound caused by the speaker signals and sound at the predetermined position. The vehicle acoustic model may be derived from previously recorded speaker data from the vehicle and previously recorded data from microphones associated with the noise management module in the vehicle. The sound profile may include sound signals previously recorded in the vehicle. The sound profile may include synthesized sound data. The controller may be further programmed to transfer bus communication data and sensor signals corresponding to and synchronized with the sound profile to the noise management module.

A method for simulating performance of a noise management module of a vehicle and implemented in a controller includes receiving speaker signals from the noise management module and generating a sound profile. The method further includes outputting, to microphone inputs of the noise management module, sound signals based on the sound profile and a vehicle cabin acoustic model that defines a cabin acoustic transfer function between the speaker signals and microphones located in the vehicle and associated with the noise management module. The method further includes outputting, to an audio output device, an audio signal based on the sound profile and an auralization model that defines a auralization transfer function between the speaker signals and a position within the vehicle that is different than locations corresponding to the microphones of the noise management module for rendering sound to create a spatial listening effect that recreates sound impression at the position.

The sound profile may include sound signals previously recorded in the vehicle. The method may further include outputting, to the noise management module, bus data and sensor signals associated with the sound profile. The method may further include generating the auralization model from actual speaker data from the vehicle and data from evaluation microphones placed proximate the position. The position may be associated with a seating position within the vehicle and an expected location of a head of a vehicle occupant seated at the seating position.

A computer-program product embodied in a non-transitory computer readable medium that is programmed for simulating performance of a noise management module of a vehicle includes instructions for receiving speaker signals from the noise management module, transmitting microphone signals to the noise management module, and generating a sound profile. The computer-program product further includes instructions for outputting microphone signals via a microphone interface based on the sound profile and a vehicle cabin acoustic model that defines a vehicle cabin acoustic transfer function between the speaker signals and microphones located in the vehicle and associated with the noise management module. The computer-program product further includes instructions for outputting, to an audio output device, an audio signal based on the sound profile and an auralization model that defines an auralization transfer function between the speaker signals and a position within the vehicle that is different than locations corresponding to the microphones for creating a spatial listening effect that recreates sound impression at the position.

The computer-program product further includes instructions for exchanging data and sensor signals associated with the sound profile between a controller and the noise management module. The position may be associated with a seating position within the vehicle and an expected location of a head of a vehicle occupant seated at the seating position. The vehicle cabin acoustic model may be derived from actual speaker data from the vehicle and actual data from the microphones associated with the noise management module in the vehicle and the auralization model may be derived from the actual speaker data and actual microphone data from evaluation microphones placed proximate the position in the vehicle. The audio output device may be headphones.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, field-programmable gate arrays (FPGA), memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed herein.

Testing and calibrating an active noise management system for a vehicle can be improved by implementation of an active noise management system (NMS) hardware-in-the-loop (HIL) testing system. The NMS-HIL system may be configured to allow a noise management module to be plugged in and operated in a virtual environment. The NMS-HIL may be configured to simulate the vehicle noise environment and provide signals to the noise management module under test. Results of the tests may be monitored and analyzed. An auralization feature may be utilized to virtually evaluate, both subjectively and objectively, the results.

Figure 1:
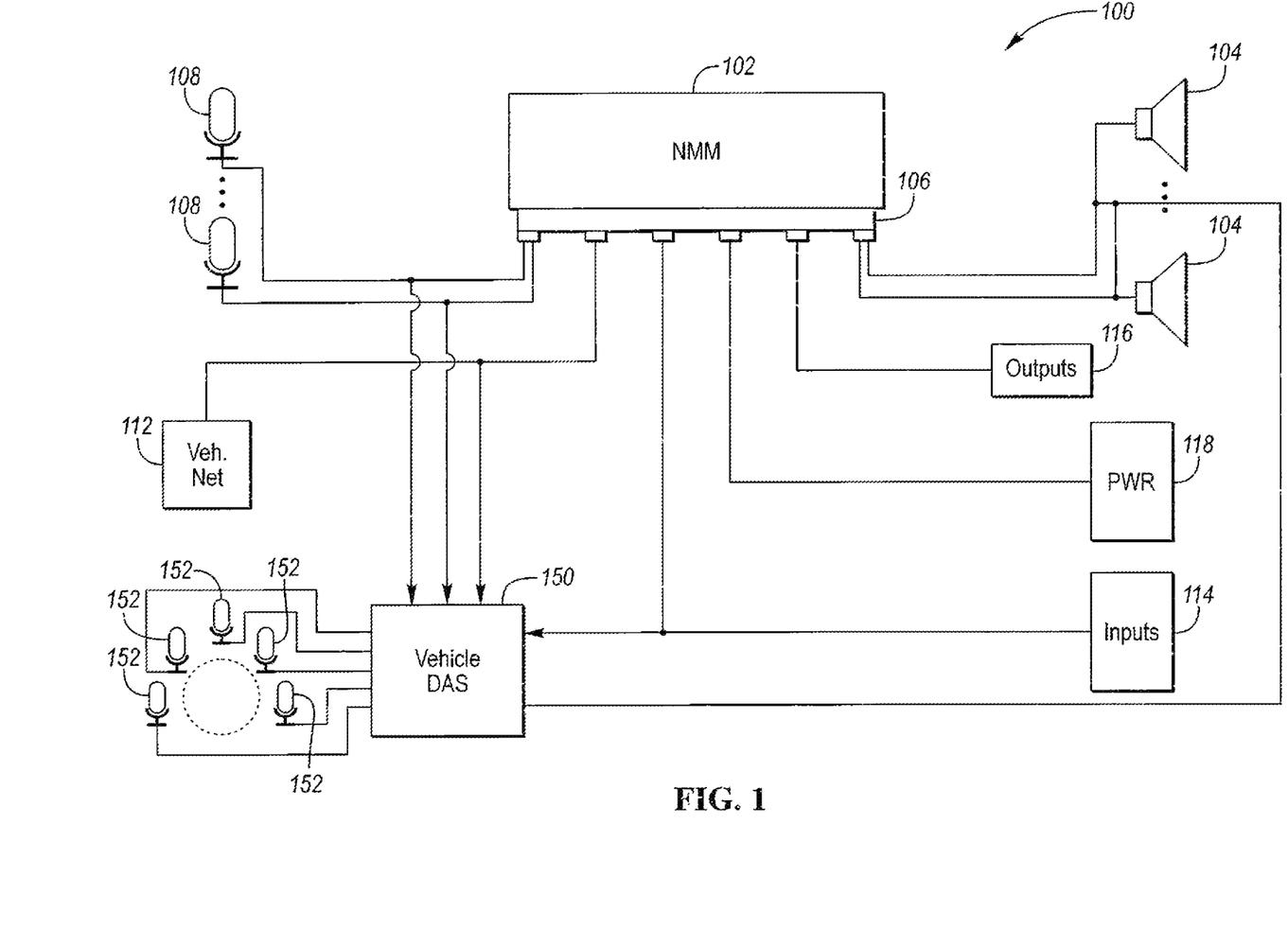
FIG. 1 depicts an active noise management system within a vehicle environment.

FIG. 1 depicts a vehicle 100 that includes a noise management module (NMM) 102. The NMM 102 may be coupled to a variety of inputs and outputs. The NMM 102 may include a microprocessor and volatile memory for executing instructions and programs. The NMM 102 may include volatile memory for storing programs and data. The volatile memory may include any memory configured to retain data between power cycles. The NMM 102 may include one or more connectors 106 that are configured to receive a mating connection from the vehicle-side. The NMM 102 may implement a variety of features related to vehicle noise management. For example, the NMM 102 may implement engine noise cancellation and road noise cancellation algorithms. The NMM 102 may also implement electronic sound synthesis to create desirable noises within the cabin.

The vehicle 100 may include one or more microphones 108 that are electrically coupled to the NMM 102 via the connector 106. The connector 106 is depicted as a single connector, but may be one or more connectors depending upon the vehicle configuration. The microphones 108 may be located at various positions within the vehicle 100. Placement of the microphones 108 may be configured to best represent the audible signals at locations at which vehicle occupants may be seated. The microphones 108 may be integrated with various components of the vehicle cabin (e.g., headliner, door trim). The microphones 108 may provide an analog signal that represents the audible noise at the position. In some configurations, the microphones 108 may convert the signal to a digital signal and pass the signal in digital form.

The vehicle 100 may include one or more speakers 104 that are electrically coupled to the NMM 102 via the electrical connector 106. The speakers 104 may be part of an audio entertainment system. One or more of the speakers 104 may be separate from the audio entertainment system. The NMM 102 may include an amplifier to drive the speakers 104 at a desired level. The speakers 104 may have an associated impedance. The speakers 104 may be positioned in various parts of the vehicle 100. For example, the speakers 104 may be installed in various locations including doors, dashboard, headliner, seats, rear hatch, and side panels. Some speakers may be placed proximate to each seating position in a seat headrest or headliner above each seat.

The NMM 102 may interface with a vehicle network 112. The vehicle network may be a digital communication link between the NMM 102 and other control modules within the vehicle 100. The vehicle network 112 may be a Controller Area Network (CAN) bus, a Local Interconnect Network (LIN) bus, a Media Oriented Systems Transport (MOST) bus, an Ethernet, and/or a FlexRay bus. The vehicle network 112 may include proprietary bus architectures as well. The vehicle network 112 may facilitate communication of data between the NMM 102 and other modules within the vehicle 100. For example, various signals, such as engine speed, accelerator pedal position, brake pedal position, engine torque, vehicle speed and transmission gear selector position, may be transferred over the vehicle network 112. Signals indicative of a powertrain mode of operation may be received (e.g., economy or reduced cylinder mode of operation) over the vehicle network 112. The NMM 102 may utilize signals received from the vehicle network 112 for operation of the noise management function. The NMM 102 may also provide signals on the vehicle network 112.

The NMM 102 may interface to various inputs 114. For example, the inputs 114 may include any signals directly wired to the NMM 102 via the connector 106. For example, the inputs 114 may include a switch input for enabling and disabling operation of the NMM 102. The inputs 114 may include an engine speed. The inputs 114 may include signals from one or more accelerometers. The inputs 114 may further include additional audio signals (e.g., for purpose of musical compensation). The inputs 114 may be reference signals. The set of inputs 114 may depend upon the vehicle configuration. The inputs 114 may include any discrete and/or analog inputs. The NMM 102 may include associated interface circuitry and software drivers for converting the inputs 114 into digital form for use by the microprocessor-based system.

The NMM 102 may interface to various outputs 116 that are directly wired to the NMM 102 via the connector 106. For example, the outputs 116 may include a status lamp for indicating the status of the NMM 102. The output 116 may include trigger signals intended for other modules. The trigger signals may be intended to trigger a specific function in receiving modules. In other examples, buffered speed signals may be transferred to through the outputs 116. The set of outputs 116 may depend upon the vehicle configuration. The outputs 116 may include any discrete and/or analog outputs. The NMM 102 may include associated interface circuitry and software drivers.

The NMM 102 may interface to a power supply 118 via the connector 106. Power and ground signals from the power supply system 118 may be routed through the connector 106. The power supply 118 may be a low-voltage bus powered by a battery and alternator. For example, a typical automotive application may operate on a 12 Volt power source. The NMM 102 may receive power from the power supply 118.

During operation of the vehicle 100, the NMM 102 may process inputs from the microphones 108 to generate output signals to the speakers 104. The processing may utilize other information from the vehicle network 112. For example, at higher engine loads and/or at higher vehicle speeds, the noise may normally increase. The NMM 102 may utilize a vehicle speed signal to adjust the speaker output volume to compensate for the expected increase in noise level. The NMM 102 may implement a noise cancelling algorithm to reduce the unwanted noise heard by occupants of the vehicle 100. The NMM 102 may implement various other control strategies.

The NMM 102 may be developed and calibrated by testing the system in the vehicle 100. Proper calibration may require repetitive test and calibration cycles under uniform operating conditions. However, replicating uniform operation conditions in the vehicle 100 may require additional testing time and effort. For example, a calibration procedure may specify operation at a fixed speed over a specified road surface. In other examples, tests that require specific speed and/or acceleration profiles may require several iterations to reproduce accurately and consistently. Therefore, an improved method for developing and testing such systems is desirable.

To facilitate development and testing and evaluation of active noise management systems, a simulator may be utilized. The simulator may allow development and testing of active noise management systems in a laboratory environment on a bench. In this manner, the simulator may result in improved repeatability of test conditions. In addition, less vehicle time is needed which minimizes the need for an actual test vehicle. The simulator may be configured to use actual data acquired from the vehicle 100. The simulator may be further configured to use predefined test scripts to simulate various vehicle conditions, thereby aiding in virtual and subjective evaluation of the sound field within the vehicle cabin.

A vehicle data acquisition system (DAS) 150 may be installed in the vehicle 100 to collect various data and signals. In some configurations, the functions performed by the vehicle DAS 150 may be implemented in the NMM 102. For example, the NMM 102 may include a selectable mode of operation for vehicle data collection. During this data collection mode, normal noise management features may be disabled. During operation of the vehicle DAS 150, the NMM 102 may be disabled or removed from the vehicle 100. The vehicle DAS 150 may be configured to receive inputs from the microphones 108 and the vehicle network 112. The vehicle DAS 150 may be configured to receive the signals from the other inputs 114 as well. A calibration or test procedure for the NMM 102 may be specified and performed while the vehicle DAS 150 is operating. The vehicle DAS 150 may be configured to collect and store the signals that are sampled during the test procedures. The result may be a database of input values that the NMM 102 would be expected to receive during the various vehicle operating conditions.

The vehicle DAS 150 may include a microprocessor and volatile memory for executing instructions and programs. The vehicle DAS 150 may include volatile memory for storing programs and data. The volatile memory may include any memory configured to retain data between power cycles. Volatile memory may include FLASH memory, hard-disk drives, and USB drives. The volatile memory may be configured to be removable to facilitate transfer of data. The vehicle DAS 150 may include a user interface that allows operation of the vehicle DAS 150 to be controlled and monitored by a user. Communication via the user interface may be a wired (e.g., USB, Ethernet) and/or wireless connection (e.g., IEEE 802.11, BLUETOOTH). The vehicle DAS 150 may include an interface for connecting to the vehicle network 112.

The vehicle DAS 150 may be used to collect noise and vehicle data for later playback. For example, microphone signals may be periodically sampled along with data from the vehicle network 112. The data may be sampled at periodic intervals and stored in non-volatile memory for later use. The data may be stored with a time-stamp to identify the relative timing of the samples so that accurate playback may be achieved. The vehicle DAS 150 may be configured to collect uncompensated data from the vehicle. That is, the data may be collected without the NMM 102 operating to modify the sounds within the cabin. The vehicle DAS 150 may collect vehicle noise data that includes engine noise during various speed and acceleration profiles. Test scenarios for collecting data may be developed for emphasizing particular noise sources. For example, different test scenarios and conditions may be conceived for recording engine noise, wind noise, suspension noise, and road noise. The test scenarios may be configured such that one type of noise is dominant in order to isolate the particular source of noise.

The vehicle DAS 150 may be configured with a connector compatible with connector 106. In this configuration, the vehicle DAS 150 may be plugged into the vehicle 100 in place of the NMM 102. In this configuration, no vehicle wiring changes are needed. In some configurations, the functions performed by the vehicle DAS 150 may be implemented in the NMM 102. The NMM 102 may include a data acquisition mode that may be entered through a diagnostic command or other trigger.

The vehicle DAS 150 may also be configured to capture signals for generating a cabin acoustic model. The vehicle DAS 150 may be electrically coupled to the speakers 104. The vehicle DAS 150 may be configured to output signals to the speakers 104 and record the inputs from the microphones 108. For some tests, the vehicle DAS 150 may drive only one of the speakers 104 at a time. The speaker signals may be configured to facilitate a characterization of the cabin acoustic model. That is, the response of the microphones to sound provided by the speakers 104. The speaker output signals may be at a predetermined frequency and predetermined amplitude. For example, the vehicle DAS 150 may output a series of sinusoidal waveforms to the speakers 104. The frequency and amplitude of the waveforms may be varied. By sweeping through a range of audible frequencies, the cabin environment may be characterized. The microphone signals may be sampled at a suitable sampling rate to capture the dynamic content of the sound waves (e.g., at least two times the highest expected frequency).

The vehicle DAS 150 may include one or more evaluation microphones 152. The evaluation microphones 152 may be utilized to collect binaural sound information from inside the cabin for auralization purposes. Signals from the evaluation microphones 152 may be recorded by the vehicle DAS 150 to collect binaural information from the cabin, separate from the vehicle microphone signals. For this purpose, additional wiring connections may be required between the evaluation microphones 152 and the vehicle DAS 150. The evaluation microphones 152 may be used to capture measurements of Head Related Transfer Functions (HRTFs) in each seat of the vehicle cabin. The evaluation microphones 152 may be placed in the vehicle in a position at which a head of an occupant may normally be. The position of the evaluation microphones 152 may be a predetermined position. The predetermined position may be defined by coordinates such as a three-dimensional distance from one of the speakers 104 or one of the microphones 108. As discussed previously, the vehicle DAS 150 may be configured to output predetermined signals to the speakers 104 and record the inputs received from the evaluation microphones 152. The data may be used to characterize the sound response proximate to an occupant.

The speaker output signals may be a combination of waveforms that are configured to sufficiently excite the dynamics of the expected transfer function to permit accurate identification. The speaker output signal may be configured to have sufficient frequency and amplitude content to properly excite the system dynamics. The corresponding response of the microphones 108 and evaluation microphones 152 may be recorded. Data collected may be stored in non-volatile memory for later processing.

A cabin or vehicle acoustic model may be generated from the data collected by the vehicle DAS 150. A transfer function from each of the speaker outputs to each of the microphone inputs may be developed resulting in a set of transfer functions. An offline processing unit may be configured to process the microphone and speaker data to generate a transfer function representing the cabin acoustic model. Various techniques are available for deriving a transfer function from the input and outputs of a system. For example, a model structure may be chosen and then system identification methods may be used to process the microphone and speaker data to define the parameters of the model structure. For example, a least-squares estimation algorithm may be used to estimate the parameters. In other examples, a deconvolution technique based on a convolution in the time domain may be used with an exponential sine sweep speaker output signal.

The vehicle acoustic model may be expressed in the frequency domain. The microphone and speaker data may be processed using a discrete Fourier transform. The microphone and speaker data may be converted to the frequency domain using the discrete Fourier transform. Parameters of a frequency domain transfer function may be computed from the frequency domain microphone and speaker data. An estimation algorithm may be executed to generate frequency domain parameters of the transfer function. A time-domain transfer function may be derived by computing an inverse Fourier transform of the frequency-domain transfer function. In other configurations, a frequency-domain transfer function may be derived by computing a Fourier transform of the time-domain transfer function.

The HRTFs may also be expressed in the frequency domain. The evaluation microphone and speaker data may be processed using a discrete Fourier transform. The evaluation microphone and speaker data may be converted to the frequency domain using the discrete Fourier transform. Parameters of a frequency domain transfer function may be computed from the frequency domain evaluation microphone and speaker data. An estimation algorithm may be executed to generate frequency domain parameters of the HRTFs. A time-domain transfer function may be derived by computing an inverse Fourier transform of the frequency-domain transfer function. In other configurations, a frequency-domain transfer function may be derived by computing a Fourier transform of the time-domain transfer function.

Figure 2:
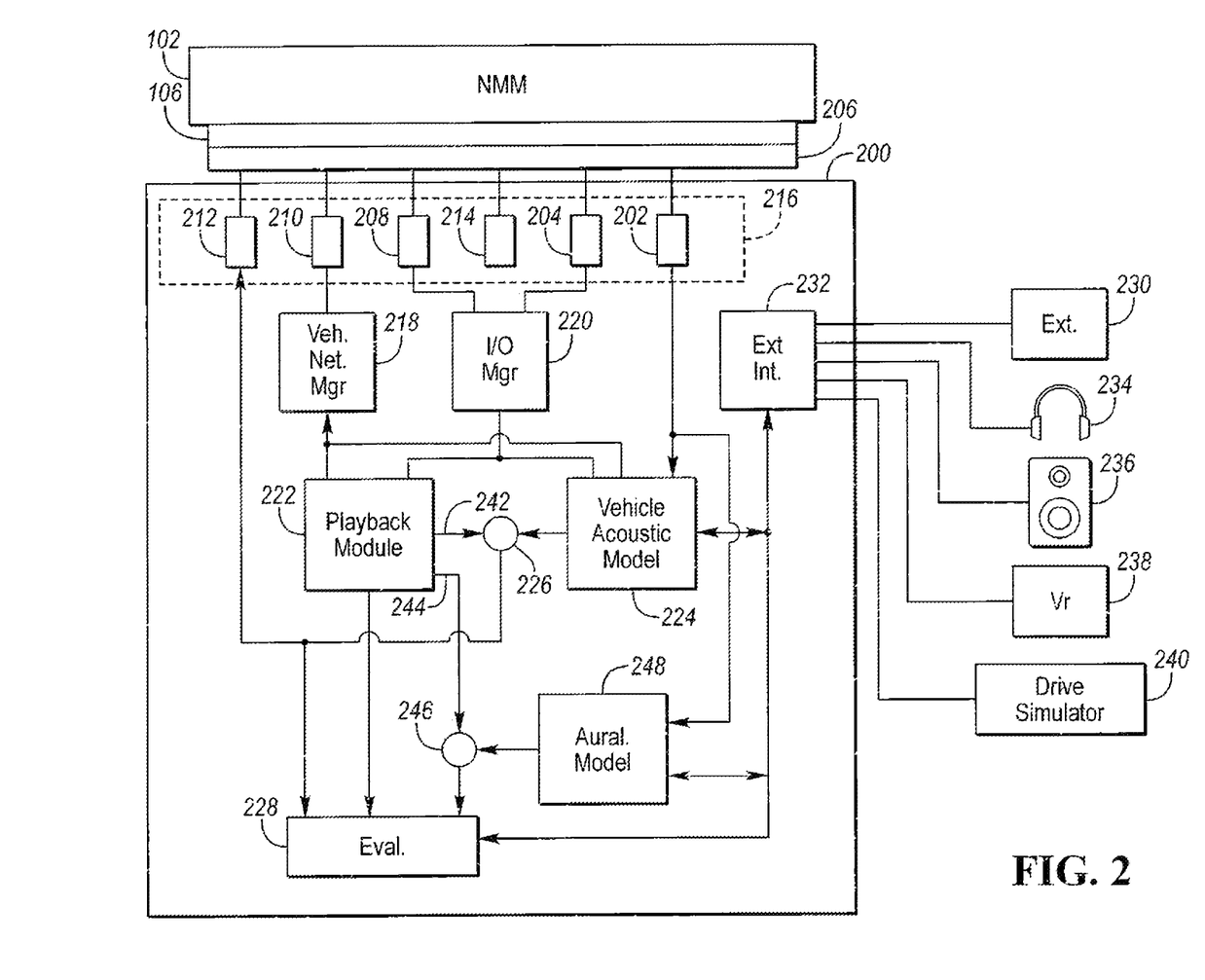
FIG. 2 depicts an active noise management system with a test environment including a hardware-in-the-loop (HIL) system with an evaluation module.

FIG. 2 depicts the NMM 102 coupled to a hardware-in-the-loop (HIL) system 200 for simulating the vehicle environment. The HIL system 200 may be configured provide signals to the NMM 102 such that the NMM 102 functions as it would in the vehicle 100. In addition, the HIL system 200 accepts the outputs from the NMM 102 in the same manner as the vehicle 100. The HIL system 200 allows the NMM 102 to operate as if it were in the vehicle 100. The HIL system 200 may be configured to receive signals from the NMM 102 and provide signals to the NMM 102 to simulate the auditory environment of a vehicle cabin. The simulation may utilize the transfer functions described previously herein that were derived from actual vehicle data. In this manner, the HIL system 200 may provide an accurate simulation of the vehicle environment for testing and calibrating the NMM 102. The HIL system 200 may further provide a virtual environment that adds auralization capability for subjectively and objectively evaluating the in-vehicle sound field.

Auralization is a technique, which renders the sound field through playback devices such as headphones or speaker arrays, to create spatial effect. This technique is used to create an external sound image for the listener, reconstructing the soundscape as a 3D impression. Auralization may require special treatment in both the recording and playback processes.

During recording, microphones (e.g., evaluation microphones 152) may be placed either directly on the listener's (or mannequin's) two ears (binaural recording), or around the listener's (or mannequin's) head with a specific pattern (e.g., circular), to capture the listener's (or mannequin's) head and torso interaction with the sound field as the sound event occurs. For example, during data collection, the evaluation microphones 152 may be positioned to be in a location where the head of an occupant would be expected. The data collection may include moving the evaluation microphones 152 to different locations. For example, the seat position may be adjusted to various positions to change the relative location of the evaluation microphones 152 relative to the speakers 104.

During playback, the binaural recording may be played back through calibrated headphones or binaural speakers to the same listener. A different listener's individual Head Related Transfer Function (HRTF) may be used to compensate for the head and torso difference, and then to convolve with the source signal for the rendered, auralized effect.

The effect of the auralization is to produce a sound field as would be heard by a person in a particular seating position within the vehicle. That is, sound may appear to be emanating from different directions. The auralization can provide this effect by producing the sound through a set of headphones or binaural speakers. A user of the virtual environment may place the headphones over their ears to receive the sound. The HIL system 200 may be configured to simulate the response at various seating positions within the vehicle. The seating position may be selectable by the operator.

The HIL system 200 may include a microprocessor and volatile memory for executing instructions and programs. The HIL system 200 may include volatile memory for storing programs and data. The volatile memory may include any memory configured to retain data between power cycles. Volatile memory may include FLASH memory, hard-disk drives, and USB drives. The volatile memory may be configured to be removable to facilitate transfer of data to other computing platforms. The modules depicted in the HIL system 200 may be implemented as hardware, software, or some combination thereof.

The HIL system 200 may include an HIL connector 206 that is compatible with the NMM connector 106. If the NMM connector 106 is comprised of multiple connectors, the HIL connector 206 may also be comprised of multiple compatible connectors. The HIL connector 206 may plug into the NMM connector 106. The NMM connector 106 plugs into the HIL connector 206 as if it were connecting the vehicle 100.

The HIL system 200 may include an NMM interface 216. The NMM interface 216 may include circuitry to provide compatible signals to the NMM 102. In addition, the NMM interface 216 may include hardware and software features that are configured to transfer signals between the NMM 102 and the HIL system 200. The NMM interface 216 may be configured to provide a specified impedance for each of the connections. The NMM interface 216 may be configured to selectively couple and decouple power or ground connections to the NMM 102 to test a response of the NMM 102 to loss of connection or power-on conditions. The selective coupling and decoupling may be under control of the microprocessor. In some configurations, the selective coupling and decoupling may be performed manually using switches.

The NMM interface 216 may be configured to provide microphone data to the NMM 102 via a microphone interface 212. The microphone interface 212 may include one or more digital-to-analog converters (DAC) configured to convert digital signals to analog signals. In addition, the microphone interface 212 may be configured to output an analog signal that is representative of the microphone signals of the vehicle microphones 108. The response of the microphone interface 212 may be configured to match the parameters of the vehicle microphones 108. For example, the microphone interface 212 may be of similar impedance to the vehicle microphones 108. In this manner, the NMM 102 may not identify any difference between signals provided by the microphone interface 212 and the actual vehicle microphones 108. The microphone interface 212 may simulate the dynamic response of microphones and may include hardware or software filters to achieve the result.

The NMM interface 216 may include a vehicle network interface 210 that is configured to transfer data to the vehicle network terminals of the NMM 102. The vehicle network interface 210 may include hardware and software drivers to communicate over the vehicle network terminals to the NMM 102. The HIL system 200 may further include a vehicle network manager 218 that is configured to provide the vehicle network signals that are used by the NMM 102. The vehicle network manager 218 may be comprised of a combination of hardware and software drivers. The vehicle network manager 218 may generate signals and messages to be transferred to the NMM 102 through the vehicle network interface 210. The vehicle network manager 218 may also convert signals and messages that are transmitted by the NMM 102 for use within the HIL system 200. The vehicle network manager 218 may provide sufficient signals and messages to simulate an error-free vehicle environment. The vehicle network manager 218 may be configured to selectively change message or signal data to simulate various conditions in the vehicle 100. For example, the vehicle network manager may be configured to change signals to simulate an error condition in a vehicle module for testing the response of the NMM 102 to the error condition.

The NMM interface 216 may include an NMM output interface 208. The NMM output interface 208 may be configured to provide signals to the HIL system 200 that are output from the NMM 102. The NMM output interface 208 may include hardware and software drivers to provide signals to the HIL system 200. For example, analog signals output from the NMM 102 may be filtered and converted to digital signals.

The NMM interface 216 may include an NMM input interface 204. The NMM input interface 204 may be configured to provide signals from the HIL system 200 to the NMM 102. The NMM input interface 204 may include hardware and software drivers to provide signals to the NMM 102. For example, the NMM input interface 204 may convert digital signals generated by the HIL system 200 to analog signals that are compatible with input specifications of the NMM 102. The NMM input interface 204 may be configured to provide the reference signals and inputs to the NMM 102. For example, any analog signals that may be used by the NMM 102 (e.g., engine speed signal) may be provided via the NMM input interface 204. For example, in a road noise cancellation application, the NMM 102 may receive accelerometer signals as analog inputs. The NMM input interface 204 may be configured to output the accelerometer signals in a format acceptable to the NMM 102.

The NMM interface 216 may include a power management interface 214. The power management interface 214 may be configured to provide power and ground signals to the NMM 102. The power management interface 214 may be controlled by the HIL system 200 to facilitate power cycling of the NMM 102. The power management interface 214 may be configured to provide a voltage and current to the NMM 102. The HIL system 200 may be configured to selectively control the voltage and current output from the power management interface 214. For example, the HIL system 200 may be capable of varying the voltage level to test the response of the NMM 102 to various power supply voltage levels.

The NMM interface 216 may include a speaker interface 202 to provide speaker data to the HIL system 200. The speaker interface 202 may include hardware and software drivers for converting speaker signals output by the NMM 102 to signals that may be processed by the HIL system 200. For example, the speaker interface may include one or more analog-to-digital converters (ADC) configured to convert analog speaker signals to digital values. The speaker interface may include circuitry to provide a compatible circuit for the NMM 102. For example, the impedance of the speaker interface 202 may be selectable to simulate various speakers. For example, the speaker interface 202 may be configurable to selectively provide a 4-ohm, 8-ohm, or 16-ohm impedance to simulate the electrical characteristics of a speaker.

The components of the NMM interface 216 may be configured to be changed or updated easily. For example, the components of the NMM interface 216 may be implemented on separate, plug-in circuit boards to allow changing the functions as designs are changed. In some configurations, the components of the NMM interface 216 may include software modules that may be easily inserted and removed. Such features may enable the HIL system 200 to be quickly updated for different vehicle configurations.

The HIL system 200 may include an input-output (I/O) management module 220. The I/O management module 220 may be configured to generate signals for transfer between the NMM 102 and the HIL system 200. The I/O management module 220 may interface with the NMM output interface 208 to provide signals to the NMM 102. The I/O management module 220 may interface with the NMM input interface 204 to receive signals from the NMM 102.

The HIL system 200 may include a playback module 222. The playback module 222 may be configured to output previously recorded vehicle data, which may include data from the vehicle microphones 108 and the evaluation microphones 152, and generate signals within the HIL system 200 to check the response of the NMM 102 to the previously recorded data set. The playback module 222 may further receive inputs from the vehicle network manager 218. Signals from the vehicle network manager 218 may be used to select playback parameters and features to properly simulate the corresponding vehicle or environment condition. For example, the previously recorded data may include microphone and vehicle network data from the vehicle test cycle. The playback module 222 may extract signals from the previously recorded data and output the signals to the NMM 102 and the HIL system 200. The playback module 222 may output the signals with the same timing as the data was recorded. The playback module 222 may include capability to play back any recorded microphone data or the outputs of the NMM 102 at the HIL 200 to represent vehicle sound field at the ear locations. For example, the playback module 222 may output microphone signals that were recorded during a vehicle test cycle. The microphone data may be transferred to the NMM 102. The NMM 102 may process the microphone data and generate speaker outputs in response. The playback module 222 may include a first output 242 that is the signals from the vehicle microphones 108. The playback module 222 may include a second output 244 that is the signals from the evaluation microphones 152. The playback module 222 may interface with the I/O management module 220 to transfer analog and/or digital signals to the NMM 102. The playback module 222 may be configured to transfer previously recorded analog signals to the NMM 102 (e.g., accelerometer signals). The analog signals and sound signals may be output with the same timing as originally recorded.

The playback module 222 may be further configured to include the playback of synthesized data. Custom playback data may be manually generated offline or generated by a simulation. Offline simulations may be performed to generate noise data for various scenarios to be tested. Synthesized data may be useful in cases in which vehicle data is challenging to obtain. For example, scenarios requiring extreme vehicle speeds may be produced using synthesized data. The playback module 222 may be further configured to provide a combination of vehicle data and synthesized data. For example, to simulate noise conditions that are not captured in the vehicle data, it may be possible to add additional noise signals into the data.

The playback module 222 may be further configured to provide additional sounds. For example, the playback module 222 may include the capability to play music similar to a vehicle stereo system. The playback module 222 may include the capability to play announcements from various vehicle systems. For example, the playback module 222 may incorporate sound output from a navigation system. Such capability allows the HIL system 200 to test the response of the NMM 102 to typical vehicle sounds to ensure that such sounds are not degraded. The playback module 222 may include a library of such vehicle sounds that may be played in various combinations to simulate system operation.

The HIL system 200 may implement a vehicle acoustic model 224. The vehicle acoustic model 224 may be implemented as a program or application. The vehicle acoustic model 224 may utilize a model of the cabin acoustics that was determined off-line. The vehicle acoustic model 224 may be expressed in the frequency domain or the time domain. Parameters for the vehicle acoustic model 224 may be derived from the actual vehicle test data. The vehicle acoustic model 224 may be in the form of one or more transfer functions or impulse responses. The vehicle acoustic model 224 may receive speaker data and/or signals via the speaker interface 202. The vehicle acoustic model 224 may process the speaker signals using the transfer function to generate microphone signals. The microphone signals may be the sound signal expected at the location of the vehicle microphones 108 within the vehicle cabin. The vehicle acoustic model 224 may further receive inputs from the I/O management module 220. The vehicle acoustic model 224 may further receive inputs from the vehicle network manager 218. For example, a window status signal may be provided by the vehicle network manager 218. Signals from the vehicle network manager 218 may be used to select an acoustic model and/or parameters to properly simulate the vehicle or environment condition.

The vehicle acoustic model 224 may output a time-domain signal representing the sound signal expected at each of the vehicle microphones 108. The transfer function may be expressed as a time-domain function (e.g., impulse response). The vehicle acoustic model 224 may implement one or more convolution functions to process the speaker input signals. Convolving the time-domain transfer function with the speaker input signals may provide a time-domain signal indicative of the sound at the associated microphone location. The vehicle acoustic model 224 may also be implemented as one or more filters or frequency-domain transfer functions. Parameters of the filter or frequency-domain transfer function may be converted to a corresponding discrete-time transfer function to process the sampled speaker signals. The vehicle acoustic model 224 may be implemented and/or include features to minimize any delays in the signals due to computation latency.

The vehicle acoustic model 224 may output a signal indicative of the sound at the location of each of the microphones that is caused by the speaker output generated by the NMM 102. This signal may be merged or combined with the sound signal (e.g., first output 242) generated by the playback module 222. The output of vehicle acoustic model 224 and the playback module 222 may be routed to a combiner 226. The combiner 226 may be a summer that is configured to add the signals together. For example, the playback module 222 provides a sound signal at the microphones 108 representing the actual noise during a vehicle test. The vehicle acoustic model 224 provides a sound signal at the microphones 108 representing the sound generated by the NMM 102 to cancel the noise. The two signals may be combined to represent the resulting sound signal comprised of the playback signal and the compensation signal at the microphones. An output of the combiner 226 may be provided to the microphone interface 212 for transferring to the NMM 102.

The HIL system 200 may further include an auralization model 248. The evaluation microphones 152 may be used to derive transfer function data or impulse response data at the passenger ear locations in each seat, which may also be referred to as binaural information. The auralization model 248 may output a time-domain signal representing the sound signal expected at the ears of an occupant at a given location in the vehicle. The transfer function may be expressed as a time-domain function (e.g., impulse response). The auralization model 248 may implement a convolution function to process the signals from the speaker input signals. Convolving the time-domain transfer function with the speaker input signals may provide a time-domain signal indicative of the sound at the ears of the occupant. This convolution process includes the cabin acoustics derived from the Head Related Transfer functions and recorded by the evaluation microphones 152. The auralization model 248 may also be implemented as a filter or frequency-domain transfer function. Parameters of the filter or frequency-domain transfer function may be converted to a discrete-time transfer function to process the sampled speaker output signals. The auralization model 248 may be implemented and/or include features to minimize any delays in the signals due to computation latency.

The auralization model 248 may output a signal indicative of the sound at the location of each of the evaluation microphones 152 that is caused by the speaker output generated by the NMM 102. This signal may be merged or combined with the sound signal (e.g., second output 244) generated by the playback module 222. The output of auralization model 248 and the playback module 222 may be routed to a second combiner 246. The second combiner 246 may be a summer that is configured to add the signals together. For example, the playback module 222 provides a sound signal at the evaluation microphones 152 representing the actual noise during a vehicle test. The auralization model 248 provides a sound signal at the evaluation microphones 152 representing the sound generated by the NMM 102 to cancel the noise. The two signals may be combined to represent the resulting sound signal comprised of the playback signal and the compensation signal at the evaluation microphones 152. An output of the combiner 246 may be provided to evaluation module 228 and may be output to headphones 234 and/or binaural speakers 236.

In this manner, the HIL system 200 simulates the vehicle interior and allows the NMM 102 to be tested and calibrated. The HIL system 200 simulates the response of the vehicle sound system to control signals provided by the NMM 102. The HIL system 200 may further include an evaluation module 228. The evaluation module 228 may process the original vehicle microphone signals provided by the playback module 222 and the compensated sound provided by the combiner 226. The evaluation module 228 may process the original evaluation microphones signals provided by the playback module 222 and the compensated sound provided by the combiner 246. The evaluation module 228 may be programmed to automate the analysis of the signals. For example, the evaluation module 228 may provide statistics regarding the level of noise reduction. Outputs of the evaluation module 228 may be saved and stored in non-volatile memory for later comparison. The evaluation module 228 may allow for the comparison of different control strategies implemented by the NMM 102. In addition, the evaluation module 228 may enable comparison of parameter changes to the NMM 102. The evaluation module 228 may further record and analyze signals provided by the vehicle network manager 218, NMM input interface 204, and the NMM output interface 208. The evaluation module 228 may also examine the frequency spectrum of the playback signal and the compensated signal to evaluate the effectiveness of the system. For example, the evaluation module 228 may perform a Fourier Transform on the signals to generate the frequency content.

The HIL system 200 may be further configured to test the noise synthesis capabilities of the NMM 102. The NMM 102 may include electronic sound synthesis algorithms. For example, the NMM 102 may be configured to generate simulated engine noise during acceleration events. The evaluation module 228 may be configured to evaluate the noise generated by the electronic sound synthesis system. The playback module 222 may include simulation data for testing noise generation capabilities of the NMM 102. For example, the NMM 102 may be configured to generate an engine noise sound profile during certain acceleration events. The playback module 222 may be configured with a variety of acceleration events. Tests may be performed using the acceleration events to determine if the proper response is obtained.

The HIL system 200 may be configured with an external interface module 232. The external interface module 232 may be configured to interface with an external computing system 230. The external interface module 232 may include a Universal Serial Bus (USB), Ethernet, and/or wireless network interface. The external interface module 232 may allow access to the HIL system 200 by the external computing system 230. For example, the external computing system 230 may be used to monitor the HIL system 200 and update parameters of the HIL system 200. The external computing system 230 may transfer configuration data to the HIL system 200 via the external interface module 232. Further, the HIL system 200 may be reprogrammed via the external interface module 232. For example, the external computing system 230 may be configured to reprogram the vehicle acoustic model and the auralization model and modify parameters of the models. The external interface module 232 may be permit the HIL system 200 to report data to the external computing system 230. The external interface module 232 may further permit operation of the HIL system 200 to be controlled and monitored by the external computing device 230.

The external interface module 232 may be configured to interface with other devices. The external interface module 232 may include an interface for headphones 234 that may be connected to the HIL system 200. The headphones 234 may provide a stereo output to a listener. The external interface module 232 may further include an interface for one or more speakers 236. For example, binaural speakers may be connected to the HIL system 200. A binaural speaker system may include left and right speakers and be configured to minimize cross-talk between the left and right sources. The external interface module 232 may be further configured to include an interface for a virtual reality (VR) system 238. For example, the VR system 238 may include audio and visual feedback to a simulation user. The external interface module 232 may further include an interface to a driving simulator 240. The driving simulator 240 may permit a user to simulate various driving conditions. For example, the driving simulator 240 may be used to provide speed and acceleration profiles to the HIL system 200.

The external computing system 230 may be configured to provide input to the playback module 222. For example, an operator of the external computing system 230 may select a test to be performed or request playback of a predetermined test pattern.

The HIL system 200 may further include a display for interfacing with an operator. The display may be a touch-screen display. In addition, HIL system 200 may include input devices such as a keyboard or mouse to allow inputs from operator. The HIL system 200 may include hardware and software drivers for providing an operator interface.

The HIL system 200 may utilize the auralization method to render the sound field at the ear location of each seat in the cabin. The HIL system 200 may include a set of headphones 234 or binaural speakers 236 to enable subjective evaluation of the interior sound quality of the cabin, virtually. The HIL system 200 may be extended to provide feedback to the output of the headphones 234 with a head-tracking device plugged in, providing a complete in-vehicle sound field representation in every seat with movement of the head. The operator may select various sound signals to be played through the headphones 234. For example, the operator may select to listen to the original vehicle microphone data and the compensated microphone data. The operator may further select to listen to the original evaluation microphone data or compensated evaluation microphone data with the auralization model applied.

Figure 3:
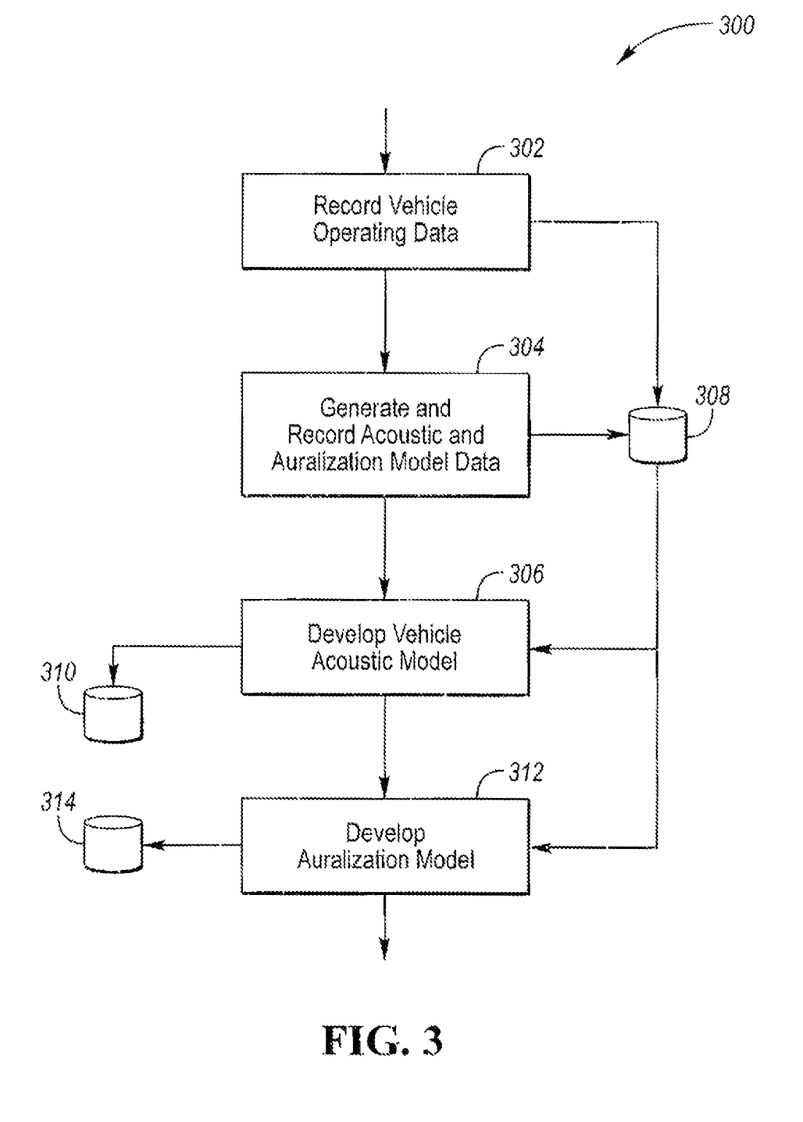
FIG. 3 depicts a possible flowchart for collecting vehicle data.

FIG. 3 depicts a possible flowchart for generating noise profiles and vehicle data. At operation 302, vehicle operating data may be recorded. For example, the vehicle may be operated with various speed and acceleration profiles. Signals at each microphone 108 and evaluation microphone 152 may be sampled and stored in a vehicle data database 308 for later use. In addition, information from the vehicle network 112 may be recorded. The vehicle operating data may be sampled periodically and stored with time-stamp data. The recording may be manually triggered by an operator. The recording may also be automated based on vehicle operating conditions.

At operation 304, the vehicle audio system may be operated to provide data for modeling the vehicle acoustic and auralization environment. For example, predetermined speaker output signals may be generated and played through the speakers 104. Signals generated by the microphones 108 and the evaluation microphones 152 in response to the speaker outputs may be recorded and stored in the vehicle data database 308 for later processing.

At operation 306, the vehicle acoustic model may be developed from the data stored from operation 304. The speaker and microphone data may be used to construct one or more transfer functions between the speakers 104 and microphones 108. The transfer functions may define the response of the microphones 108 to the outputs of the speakers 104. The parameters describing the transfer functions may be saved in a vehicle acoustic model database 310 for later use. The parameters may be transferred to the HIL system 200.

At operation 312, the auralization model may be developed from the data stored from operation 304. The speaker and evaluation microphone data may be used to construct one or more auralization transfer functions between the speakers 104 and the evaluation microphones 152. The auralization transfer functions may define the response of the evaluation microphones 152 to the outputs of the speakers 104. The parameters describing the transfer functions may be saved in an auralization model database 314 for later use. The parameters may be transferred to the HIL system 200.

Figure 4:
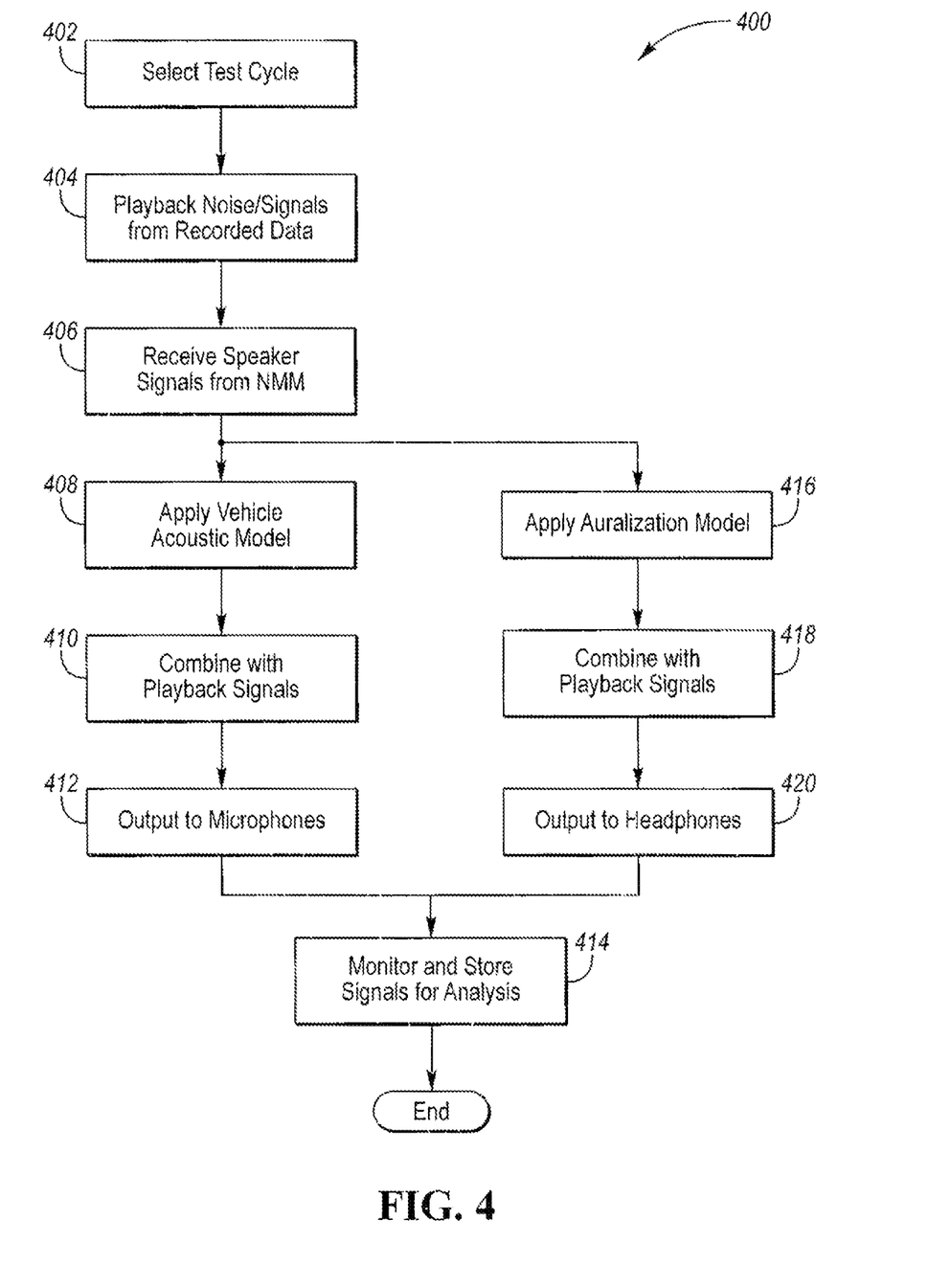
FIG. 4 depicts a possible flowchart for operating the active noise management HIL system.

FIG. 4 depicts a flowchart for a possible sequence of operations for implementing the HIL system 200. At operation 402, a test cycle may be selected. The selection may be an automated selection in which the controller sequences through a predetermined set of test cycles. In some configurations, an operator may select a test cycle. At operation 404, the controller may be configured to playback noise signals from pre-recorded data (e.g., from the vehicle data database 308). The noise signals may be output as microphone signals to the NMM 102. At operation 406, speaker signals may be received from the NMM 102. The NMM 102 may process the microphone data and generate speaker data. At operation 408, the speaker signals may be processed through the vehicle acoustic model 224. For example, a real-time convolution may be performed on the speaker signals and one or more time-domain transfer functions of the vehicle acoustic model 224. At operation 410, the output of the vehicle acoustic model 224 may be combined with the playback noise signals to derive the microphone signals. The combined signal may represent the microphone data after noise compensating signals have been applied. At operation 412, the combined signal may be output to the microphone interface 212.

At operation 416, the auralization model 248 may be applied to the speaker signals. For example, a real-time convolution may be performed on the speaker signals and one or more time-domain transfer functions of the auralization model 248. At operation 418, the output of the auralization model 248 may be combined with the playback noise signals to derive the sound output signals. The combined signal may represent the evaluation microphone data after noise compensating signals have been applied. At operation 420, the combined output may be provided to the headphones 234 for the listener. At operation 414, the noise, compensated noise signals, and auralization model outputs may be stored or processed for further analysis. The operations depicted are not necessarily performed sequentially and operations may be performed in parallel. Further, the operation sequence may be iterative and the sequence may be repeated at predetermined intervals.

Although the above HIL system 200 is described with reference to a vehicle-based active noise management system, the usage of the HIL system 200 is not necessarily limited to an automotive environment. The HIL system 200 may find use for any applications in which an active noise management system may be utilized. The methods of collecting data and replaying the data in the HIL system 200 may be used for testing other types of active noise management systems.

The HIL system 200 improves testing and calibration of noise management systems for vehicles. The HIL system 200 may also reduce development cost as development may be done under laboratory conditions without requiring a vehicle for development. The HIL system 200 also allows for consistent and accurate reproduction of the noise environment of the vehicle which allows for more cost-effective tuning and calibration of the noise management systems.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for evaluating a noise management module of a vehicle, the system comprising:
 a controller programmed to:
  receive speaker signals from the noise management module and transfer microphone signals to the noise management module;
  filter the speaker signals with a vehicle acoustic model to generate sound signals caused by the speaker signals at positions corresponding to locations of microphones in the vehicle that are associated with the noise management module;
  combine a sound profile and the sound signals to generate the microphone signals;
  filter the speaker signals with an auralization model to produce rendered sound signals that create a spatial listening effect to simulate sound caused by the speaker signals at a predetermined position within the vehicle that is different than the positions corresponding to the locations of the microphones; and
  apply a convolution function on a time domain transfer function, via the auralization model, to provide a time-domain signal indicative of a sound at ears of a user.

2. The system of claim 1, wherein the predetermined position is associated with a seating position within the vehicle and an expected location of a head of a vehicle occupant seated at the seating position.

3. The system of claim 1, wherein the auralization model is derived from actual speaker data from the vehicle and actual microphone data from evaluation microphones placed proximate the predetermined position in the vehicle.

4. The system of claim 1, wherein the controller is further programmed to combine the rendered sound signals with the sound profile to generate an evaluation sound signal.

5. The system of claim 4, wherein the controller is further programmed to output the evaluation sound signal to an audio output device.

6. The system of claim 1, wherein the auralization model represents an acoustic environment of the vehicle and defines a transfer function between sound caused by the speaker signals and sound at the predetermined position.

7. The system of claim 1, wherein the vehicle acoustic model is derived from previously recorded speaker data from the vehicle and previously recorded data from microphones associated with the noise management module in the vehicle.

8. The system of claim 1, wherein the sound profile includes sound signals previously recorded in the vehicle.

9. The system of claim 1, wherein the sound profile includes synthesized sound data.

10. The system of claim 1, wherein the controller is further programmed to transfer bus communication data and sensor signals corresponding to and synchronized with the sound profile to the noise management module.

11. A method for simulating performance of a noise management module of a vehicle and implemented in a controller, the method comprising:
 receiving speaker signals from the noise management module;
 generating a sound profile;
 outputting, to microphone inputs of the noise management module, sound signals based on the sound profile and a vehicle cabin acoustic model that defines a cabin acoustic transfer function between the speaker signals and microphones located in the vehicle and associated with the noise management module;
 outputting, to an audio output device, an audio signal based on the sound profile and an auralization model that defines an auralization transfer function between the speaker signals and a position within the vehicle that is different than locations corresponding to the microphones for rendering sound to create a spatial listening effect that recreates sound impression at the position; and
 applying a convolution function on a time domain transfer function, via the auralization model, to provide a time domain signal indicative of a sound at ears of a user.

12. The method of claim 11, wherein the sound profile includes sound signals previously recorded in the vehicle.

13. The method of claim 11 further comprising outputting, to the noise management module, bus data and sensor signals associated with the sound profile.

14. The method of claim 11 further comprising generating the auralization model from actual speaker data from the vehicle and data from evaluation microphones placed proximate the position.

15. The method of claim 11, wherein the position is associated with a seating position within the vehicle and an expected location of a head of a vehicle occupant seated at the seating position.

16. A computer-program product embodied in a non-transitory computer readable medium that is programmed for simulating performance of a noise management module of a vehicle, the computer-program product comprising instructions for:
receiving speaker signals from the noise management module;
transmitting microphone signals to the noise management module;
generating a sound profile;
outputting microphone signals via a microphone interface based on the sound profile and a vehicle cabin acoustic model that defines a vehicle cabin acoustic transfer function between the speaker signals and microphones located in the vehicle and associated with the noise management module;
outputting, to an audio output device, an audio signal based on the sound profile and an auralization model that defines an auralization transfer function between the speaker signals and a position within the vehicle that is different than locations corresponding to the microphones for creating a spatial listening effect that recreates sound impression at the position; and
applying a convolution function on a time domain transfer function, via the auralization model, to provide a time-domain signal indicative of a sound at ears of a user.

17. The computer-program product of claim 16, further comprising instructions for exchanging data and sensor signals associated with the sound profile between a controller and the noise management module.

18. The computer-program product of claim 16, wherein the position is associated with a seating position within the vehicle and an expected location of a head of a vehicle occupant seated at the seating position.

19. The computer-program product of claim 16, wherein the vehicle cabin acoustic model is derived from actual speaker data from the vehicle and actual data from the microphones associated with the noise management module in the vehicle and the auralization model is derived from the actual speaker data and actual microphone data from evaluation microphones placed proximate the position in the vehicle.

20. The computer-program product of claim 16, wherein the audio output device is headphones.

* * * * *